United States Patent
Brandli et al.

(10) Patent No.: US 10,302,420 B2
(45) Date of Patent: May 28, 2019

(54) METHOD FOR RECONSTRUCTING A SURFACE USING SPATIALLY STRUCTURED LIGHT AND A DYNAMIC VISION SENSOR

(71) Applicants: Universitat Zurich, Zurich (CH); ETH Zurich, Zurich (CH)

(72) Inventors: Christian Brandli, Zurich (CH); Tobias Delbruck, Zurich (CH); Markus Andreas Hopflinger, Wallisellen (CH); Marco Hutter, Kriessern (CH); Thomas Albert Mantel, Winterthur (CH)

(73) Assignees: Universitat Zurich, Zurich (CH); Eth Zurich, Zurich (CH)

( * ) Notice: Subject to any disclaimer, the term of this patent is extended or adjusted under 35 U.S.C. 154(b) by 77 days.

(21) Appl. No.: 15/107,375

(22) PCT Filed: Dec. 22, 2014

(86) PCT No.: PCT/EP2014/078985
§ 371 (c)(1),
(2) Date: Jun. 22, 2016

(87) PCT Pub. No.: WO2015/097149
PCT Pub. Date: Jul. 2, 2015

(65) Prior Publication Data
US 2017/0003121 A1    Jan. 5, 2017
US 2017/0241774 A9    Aug. 24, 2017

(30) Foreign Application Priority Data
Dec. 23, 2013  (EP) .................................... 13199421

(51) Int. Cl.
*G01B 11/30*  (2006.01)
*G01B 11/25*  (2006.01)
(Continued)

(52) U.S. Cl.
CPC ............ *G01B 11/25* (2013.01); *G01B 11/002* (2013.01); *G01S 7/484* (2013.01); *G01S 7/487* (2013.01);
(Continued)

(58) Field of Classification Search
CPC ............................. G01B 11/002; G01B 11/25
(Continued)

(56) References Cited

U.S. PATENT DOCUMENTS

2008/0135731 A1*  6/2008  Lichtsteiner ........... H04N 3/155
                                                     250/208.1
2012/0140243 A1*  6/2012  Colonna de Lega .......................
                                                     A61F 9/00836
                                                     356/609

(Continued)

FOREIGN PATENT DOCUMENTS

EP    2519001 A2    10/2012
EP    2574511 A1    4/2013
(Continued)

OTHER PUBLICATIONS

Patrick Lichtsteiner et al.: "A 128 × 128 120 db 15 s Latency Asynchronous Temporal Contrast Vision Sensor" IEEE Journal of Solid-State Circuits, vol. 34, No. 2 Feb. 2008.
(Continued)

*Primary Examiner* — Sunghee Y Gray
(74) *Attorney, Agent, or Firm* — GableGotwals (57) ABSTRACT

The present invention relates to a method for detecting and reconstructing a surface illuminated with spatially structured light such that the light illuminates an area of the surface from which the light is reflected back. The light includes a temporarily varying intensity in the form of successive light modulation patterns. The back-reflected light is detected by an optical sensor including a plurality of pixels. A pixel
(Continued)

coordinate is associated to each pixel and each pixel generated a photocurrent proportional to the intensity of the light impinging on a respective pixel, computes a signal related to a photocurrent, and each pixel outputs an address-event merely when a respective signal due to the light impinging on the respective pixel increases by an amount larger than a first threshold or decreases by an amount larger than a second threshold since a last address-event from the respective pixel.

14 Claims, 7 Drawing Sheets

(51) Int. Cl.
| | | |
|---|---|---|
| *G01B 11/00* | (2006.01) | |
| *G01S 17/42* | (2006.01) | |
| *G01S 17/89* | (2006.01) | |
| *G01S 7/481* | (2006.01) | |
| *G01S 7/484* | (2006.01) | |
| *G01S 7/487* | (2006.01) | |

(52) U.S. Cl.
CPC ............ *G01S 7/4816* (2013.01); *G01S 17/42* (2013.01); *G01S 17/89* (2013.01)

(58) Field of Classification Search
USPC .......................................................... 356/601
See application file for complete search history.

(56) References Cited

U.S. PATENT DOCUMENTS

2012/0274744 A1* 11/2012 Wan .................... H04N 5/37452
348/46
2013/0085642 A1* 4/2013 Dankers .................. B60T 8/172
701/48

FOREIGN PATENT DOCUMENTS

| WO | WO 2012055444 A1 | 5/2012 |
| WO | WO 2012160470 A1 | 11/2012 |
| WO | WO 2013083848 A1 | 6/2013 |

OTHER PUBLICATIONS

Belbachir A N et al.: "High-precision shape representation using a neuromorphic vision sensor with synchronous address-event communication interface; High-precision shape representation using a neuromorphic imaging sensor", Measurement Science and Technology Sep. 4, 2009.
Besl, P. J., and McKay N.D. (1992) A Method for Registration of 3-D Shapes. IEEE Transactions Pattern Analysis and Machine Intelligence 14, 239-256.
Robinson, A., Alboul L., and Rodrigues, M. (2003) Methods for Indexing Stripes in Uncoded Structured Light Scanning Systems in International Conference in Central Europe on Computer Graphics, Visualization and Computer Vision.
Siegwart, R. (2011) Introduction to Autonomous Mobile Robots. 2nd Edition Cambridge Mass.

* cited by examiner

METHOD FOR RECONSTRUCTING A SURFACE USING SPATIALLY STRUCTURED LIGHT AND A DYNAMIC VISION SENSOR

CROSS-REFERENCE TO RELATED APPLICATIONS

This United States application is the National Phase of PCT Application No. PCT/EP2014/078985 filed 22 Dec. 2014, which claims priority to European Patent Application No. 13199421.2 filed 23 Dec. 2013, each of which is incorporated herein by reference.

The present invention relates to a method for detecting and/or reconstructing a surface according to claim 1 as well as a corresponding computer program according to claim 15 and a system according to claim 16.

Motion planning in mobile robots requires knowledge of the terrain structure in front of and underneath the robot; possible obstacles have to be detected and their size has to be evaluated. Especially legged robots need to know the terrain on which they are moving so that they can plan their steps accordingly. A variety of 3D scanners such as the Microsoft Kinect© or LIDAR devices can be used for this task but these sensors and their computational overhead typically consume on the order of several watts of power while having a sample rate limited to tens of Hertz. Passive vision systems partially overcome these limitations but they exhibit a limited spatial resolution because their terrain reconstruction is restricted to a small set of feature points.

Based on this, the problem underlying the present invention is to provide for a method, a computer program, and system that allows for a faster detection and particularly geometric reconstruction of any surface (e.g. a terrain on which a robot moves or the recognition of gesture or posture where the respective object/surface moves and not the sensor) at a lower computational cost.

Particularly, in the sense of the present invention, to reconstruct a surface means to determine 3D (world) coordinates of said surface. Particularly, in this sense, the reconstruction is to be understood as a virtual reconstruction of the surface.

This problem is solved by a method having the features of claim 1.

According thereto, the method according to the invention comprises the steps of:
illuminating a surface with spatially structured light, such that said light illuminates an area (this area may be a connected or even a disconnected sub area) of said surface from which said light is reflected back, wherein said light comprises a temporally varying intensity in the form of successive repeated light modulation patterns (here, particularly, successive means successive in time),
wherein back-reflected light is detected by means of an optical sensor that comprises a plurality of pixels, wherein a pixel coordinate (u,v) is associated to each pixel, and wherein each pixel generates a signal (e.g. monotonically) related to a photocurrent generated by the pixel, which photocurrent is proportional to the intensity of the light impinging on the respective pixel, and wherein each pixel outputs an address-event Ev merely when the respective signal due to the e.g. back-reflected light impinging on the respective pixel increases by an amount being larger than a first threshold $\Phi_{ON}$ or decreases by an amount being larger than a second threshold $\Phi_{OFF}$ since the last address-event Ev from the respective pixel, and wherein as a current image of said area (also denoted as light or laser stripe in case spatially structured light in the form of a plane/sheet of (laser) light is used), pixel coordinates (u,v) of address-events Ev' caused by light of the last light modulation pattern back-reflected from said area onto the optical sensor are determined, particularly using scored address-events Ev of the optical sensor, wherein particularly the address events Ev are scored using collected statistics of the times t of the address-events Ev.

For instance, the pixels (which are e.g. pixel circuits) are designed to convert the photocurrent I into a signal $\ln(I_{u,v})$ which is the (e.g. natural) logarithm of the photocurrent $I_{u,v}$ of the pixel (u,v). However, the pixels (or pixel circuits) may also be designed to transform the photocurrent to a signal by e.g. applying another monotonically varying function, e.g. a square root function, to the photocurrent, or some other function that changes slowly over time to optimize the response (e.g., to optimally control the sensitive range of the response to be centered around the time-average input value). Particularly, the essential feature of the respective pixel is that it detects changes in the photocurrent and emits address-events in response to these changes.

It is to be noted, that the spatial structure of the light does not have to be repeated—only the temporal one, i.e. dots or other structures like lines etc. appearing at random positions might be possible too, as long as they are synced with the trigger event (see below).

Further, the light (intensity) modulation pattern may consist of a single intensity maximum, e.g., in the form of a pulse (e.g. a rectangular pulse), or a sequence of alternating intensity minima and maxima. For instance, the modulation pattern can be sinusoidal or even a period of pseudo-random white noise. The modulation pattern is repeated so that a periodic intensity results.

Many of the drawbacks in existing sensor setups (active as well as passive) arise from the fact that investigating visual scenes as a stroboscopic series of (depth) frames leads to redundant data that occupies communication and processing bandwidth and limits sample rates to the frame rate.

In the framework of the present invention, this is avoided by suppressing redundant information at the pixel level by having the pixels report their outputs asynchronously. This sparse asynchronous output can be evaluated more quickly (i.e. with lower average latency) and at a lower computational cost than output from a conventional frame-based image sensor. In the present application such a vision sensor, the so called dynamic vision sensor (DVS, (Lichtsteiner et al., 2008)) is combined with a light source that provides spatially structured light comprising successive repeated light modulation patterns (e.g. a pulsed line laser), forming an active sensor to reconstruct the 3D structure of the surface in front of the system while it is moved. This terrain reconstruction is based on e.g. a series of surface profiles based on the line laser pulses. Particularly, the proposed algorithm allows extracting the area (e.g. laser stripe) illuminated by the spatially structured light from the asynchronous temporal contrast events generated by the DVS using only the event timing so that the light source (e.g. laser) can be pulsed at arbitrary frequencies, particularly from below 1 Hz up to more than 1 kHz. The flexibility in choosing the pulsing frequencies allows fast and detailed surface reconstructions for fast motions as well as saving laser power for slow motions. The upper limit on frequency is determined mainly by the brightness of the lighting which affects the pixel bandwidth.

According to a preferred embodiment of the method according to the invention, said light modulation pattern is or comprises a rectangular light pulse.

Further, according to a preferred embodiment of the method according to the invention, each address-event Ev(u, v,t) carries the coordinates (u,v) of its associated pixel, a time t at which the respective address-event Ev occurred, as well as an information whether the respective address-event Ev is an ON event at which said signal increased by an amount larger than said first threshold $\Phi_{ON}$, or an OFF event at which said signal decreased by an amount larger than said second threshold $\Phi_{OFF}$, and wherein particularly an output stream is output by the optical sensor comprising said address-events Ev.

Further, according to a preferred embodiment of the method according to the invention, time-events $Et_n$, particularly also denoted as trigger-events, are put into the output data stream of the optical sensor in between address-events Ev of the output stream, particularly by means of the optical sensor, wherein each time-event $Et_n$ is uniquely associated to the same phase of the light modulation pattern, wherein each time-event $Et_n$ carries an ascending natural number n labeling the respective light modulation pattern as well as its time t (e.g. the time at which said light modulation pattern occurred). Particularly, the time-events are triggered by the individual light modulation patterns or vice versa.

Further, according to a preferred embodiment of the method according to the invention, a score s is assigned to each ON event by means of a first scoring function $P_n^{ON}(Ev)$ and to each OFF event by means of a second scoring function $P_n^{OFF}(Ev)$, wherein particularly each score merely depends on the address-event's time relative to the last time-event $Et_n$, wherein particularly the respective score s is a measure for the probability that the respective address-event Ev was caused by the last light modulation pattern associated to the last time-event $Et_n$.

Further, according to a preferred embodiment of the method according to the invention, for determining the first scoring function $P_n^{ON}(Ev)$ at least ON events Ev since the time-event $Et_{n-1}$ and before the last time-event $Et_n$ are collected in bins $B_n$ of a first histogram $H_n^{ON}$ depending on the time relative to the time-event $Et_{n-1}$. Preferably, a first average histogram $H_{n,avg}^{ON}$ is determined as an average over m of said first histograms associated to m successive time-event intervals $Et_{n-m}$ to $Et_{n+1-m}$, ..., $Et_{n-1}$ to $Et_n$, m being a natural number (e.g. m=1, 2, or 3 for instance). Further, preferably, for determining the second scoring function at least OFF events Ev since the time-event $Et_{n-1}$ and before the last time event $Et_n$ are collected in bins $B_n$ of a second histogram $H_n^{OFF}$ depending on the time relative to the time-event $Et_{n-1}$. Preferably, a second average histogram $H_{n,avg}^{OFF}$ is determined as an average over m of said second histograms associated to the m successive time-event intervals $Et_{n-m}$ to $Et_{n+1-m}$, ..., $Et_{n-1}$ to $Et_n$, m being the above defined natural number. In case of m=1, the respective average histogram corresponds to the respective histogram.

Further, according to a preferred embodiment of the method according to the invention, the first scoring function $P_n^{ON}(Ev)$ is determined from the first average histogram $H_{n,avg}^{ON}$ by subtracting from the first average histogram $H_{n,avg}^{ON}$ the average bin count $T_n^{ON}/k$ of the first average histogram $H_{n,avg}^{ON}$, and particularly by also normalizing the first average histogram $H_{n,avg}^{ON}$ by the total number of ON events $T_n^{ON}$ in it. Further, preferably, the second scoring function $P_n^{OFF}(Ev)$ is determined from the second average histogram $H_{n,avg}^{OFF}$ by subtracting from the second average histogram $H_{n,avg}^{OFF}$ the average bin count $T_n^{OFF}/k$ of the second average histogram $H_{n,avg}^{OFF}$, and particularly by also normalizing the second average histogram $H_{n,avg}^{OFF}$ by the total number of OFF events $T_n^{OFF}$ in it.

Further, according to a preferred embodiment of the method according to the invention, a score map $M_n$ is generated assigning to each pixel coordinate (u,v) the sum of the scores s of all ON and OFF events Ev with address (u,v) since the last time-event $Et_n$ and before the next time-event $Et_{n+1}$. Preferably, an average score map $M_{n,avg}$ is determined as an average over the last o score maps $M_n$, o being a natural number (e.g. o=1, 2, or 3). In case of o=1, the average score map corresponds to the score map.

Further, according to a preferred embodiment of the method according to the invention, the spatially structured light is or comprises an e.g. horizontally oriented plane of light, such that said area or said image of said area is (or comprises) a one-dimensional possibly non-continuous pattern also denoted as light or laser (in case a laser is used) stripe.

Further, according to a preferred embodiment of the method according to the invention, the maximum score in the average score map $M_{n,avg}$ is determined for each column (e.g. u) of the average score map $M_{n,avg}$, wherein in case the maximum score is above a pre-defined threshold value the corresponding pixel coordinate (u,v) is determined to be a pixel coordinate of said current image, and wherein particularly in case the average score map $M_{n,avg}$ comprises in a column scores s of neighboring pixel coordinates that are also above said threshold value, a weighted average among the scores above said threshold value is conducted to determine the center of said current image of said area in the respective column. Preferably, the weighting consists of multiplying each of said pixel coordinates by the normalized score at the respective coordinate, wherein the normalized score is determined by dividing each score by the sum of the scores in the column.

Further, according to another preferred embodiment of the method according to the invention, the spatially structured light consists of or comprises a sparse set of light rays by means of which an area of said surface is illuminated, such that said area consists of a corresponding sparse number of disconnected zones. Said number is preferably equal or below 10% of the number of pixels of the optical sensor.

Further, according to a preferred embodiment of the method according to the invention, the maximum scores in the average score map $M_{n,avg}$ are determined by maintaining for each region associated to one of the zones only the maximum score, wherein the pixel coordinate (u,v) of the current image of each zone is determined as the pixel coordinate of the maximum score of the associated region.

Further, according to a preferred embodiment of the method according to the invention, said regions are determined by an exhaustive search of the average score map $M_{n,avg}$ for local maxima.

Further, according to a preferred embodiment of the method according to the invention, a light source providing said spatially structured light and the image sensor remain in a fixed spatial position with respect to each other while moving relative to said surface so that said illuminated spatial area of said surface moves along the surface, i.e., scanning the surface.

Further, according to a preferred embodiment of the method according to the invention, the pixel coordinates (u,v) of the current image of said spatial area are transformed into world coordinates (x, y, z) so as to reconstruct said surface in said world coordinates.

According to yet another preferred embodiment the spatial structure of the spatially structured light may be varied over time, i.e., over said successive light modulation patterns, particularly so that a larger fraction of said surface is covered by said illuminated spatial area, so that the surface may be sampled at higher spatial density or even when there is no relative movement between the camera and the surface.

Furthermore, the problem underlying the present invention is solved by a computer program according to claim 15.

According thereto, the computer program comprises program commands/code, which are adapted to conduct the following steps when the computer program is executed on a computer or loaded into a memory of the computer:

receiving an output stream from an optical sensor comprising address-events Ev generated by said optical sensor when a surface is illuminated with spatially structured light, such that said light illuminates an area (can also be disconnected) of said surface from which at least a portion of said light is reflected back on the optical sensor, wherein said light comprises a temporarily varying intensity in the form of successive (e.g. repeated) light modulation patterns, and wherein said optical sensor comprises pixels, wherein a pixel coordinate (u,v) is associated to each pixel, and wherein each pixel generates a signal related to a photocurrent being proportional to the intensity of the light impinging on the respective pixel, and wherein each pixel outputs an address-event Ev comprised by said output stream merely when the respective signal due to back-reflected light impinging on the respective pixel increases by an amount being larger than a first threshold $\Phi_{ON}$ or decreases by an amount being larger than a second threshold $\Phi_{OFF}$ since the last address-event Ev from the respective pixel, and wherein as a current image of said area, pixel coordinates (u,v) of address-events Ev' caused by light of the last light modulation pattern back-reflected from said area onto the optical sensor are determined, particularly using scored address-events Ev of the optical sensor, wherein particularly the address events Ev are scored using collected statistics of the times t of the address-events Ev, and wherein particularly the scores are determined using statistics collected based on the event Ev and the light modulation pattern trigger events Et.

Preferably, the program code of the computer program according to the invention is further adapted to conduct any of the steps stated in one of the claims 2 to 14 or any of the steps described below when the computer program is executed on a computer or loaded into a memory of the computer.

Preferably, the program code of the computer program is adapted to read said output stream containing the address-events Ev described above when the computer program is executed on a computer or loaded into the memory of the computer.

Further, preferably, as described above, the output stream also comprises the afore-described time-events $Et_n$ injected into the output stream in between address-events Ev of the output stream.

Further, preferably, the program code of the computer program is adapted to assign a score s to each ON event by means of a first scoring function $P_n^{ON}(Ev)$ and to each OFF event by means of a second scoring function $P_n^{OFF}(Ev)$, wherein particularly the respective score s is a measure for the probability that the respective address-event Ev was caused by the modulation pattern associated to the last time-event $Et_n$ (see also above).

Further, preferably, for determining the first scoring function $P_n^{ON}(Ev)$, the program code of the computer program is adapted to collect at least ON events Ev in the time-event interval $Et_{n-1}$ to $Et_n$ in bins $B_n$ of a first histogram $H_n^{ON}$ depending on the time relative to the time-event $Et_{n-1}$, wherein particularly the program code is adapted to determine a first average histogram ($H_{n,avg}^{ON}$) as an average over m of said first histograms $H_n^{ON}$ associated to m successive time-event intervals $Et_{n-m}$ to $Et_{n+1-m}$, ..., $Et_{n-1}$ to $Et_n$, m being a natural number (e.g. m=1, 2 or 3), and wherein for determining the second scoring function $P_n^{OFF}$, the program code of the computer program is adapted to collect at least OFF events Ev in the time-event interval $Et_{n-1}$ to $Et_n$ in bins $B_n$ of a second histogram $H_n^{OFF}$ depending on the time relative to the time-event $Et_{n-1}$, wherein particularly the computer program is adapted to determine a second average histogram $H_{n,avg}^{OFF}$ as an average over m second histograms associated to m preceding successive time-event intervals $Et_{n-m}$ to $Et_{n+1-m}$, ..., $Et_{n-1}$ to $Et_n$, m being the afore-defined natural number.

Further, preferably, the program code of the computer program is adapted to determine the first scoring function $P_n^{ON}(Ev)$ from the first average histogram $H_{n,avg}^{ON}$ by subtracting from the first average histogram $H_{n,avg}^{ON}$ the average bin count $T_n^{ON}/k$ of the first average histogram $H_{n,avg}^{ON}$, and particularly by also normalizing the first average histogram $H_{n,avg}^{ON}$ by the total number of ON events in it $T_n^{ON}$, and wherein the program code is adapted to determine the second scoring function $P_n^{OFF}(Ev)$ from the second average histogram $H_{n,avg}^{OFF}$ by subtracting from the second average histogram $H_{n,avg}^{OFF}$ the average bin count $T_n^{OFF}/k$ of the second average histogram $H_{n,avg}^{OFF}$, and particularly by also normalizing the second average histogram $H_{n,avg}^{OFF}$ by the total number of OFF events $T_n^{OFF}$ in it.

Further, preferably, the program code of the computer program is adapted to generate a score map $M_n$ assigning to each pixel coordinate (u,v) the sum of the scores s of all ON and OFF events Ev with the respective address (u,v) since the last time-event $Et_n$ and before the next time-event $Et_{n+1}$, wherein particularly an average score map $M_{n,avg}$ is determined as an average over the last o score maps $M_n$, o being a natural number (e.g. o=1, 2, or 3).

Further, preferably, the program code of the computer program is adapted to determine the maximum score in the average score map $M_{n,avg}$ for each column (e.g. u) of the average score map $M_{n,avg}$, wherein in case the maximum score is above a pre-defined threshold value the corresponding pixel coordinate (u,v) is determined to be a pixel coordinate of said current image, and wherein particularly in case the average score map $M_{n,avg}$ comprises in a column scores s of neighboring pixel coordinates that are also above said threshold value, the program code is adapted to conduct a weighted average among the scores above said threshold value to determine the center of said current image of said area in the respective column, wherein particularly the weighting consists of multiplying each said pixel coordinate by the normalized score at this coordinate, wherein the normalized score is determined by dividing each score by the sum of the scores in the column.

Further, particularly in case the spatially structured light consists of or comprises a set of light rays by means of which an area of said surface is illuminated, such that said area consists of (or comprises) a corresponding number of disconnected zones, the program code of the computer program may be adapted to determine the maximum scores in the average score map $M_{n,avg}$ by maintaining for each region associated to one of the zones only the maximum score, wherein the pixel coordinate (u,v) of the current image of each zone is determined as the pixel coordinate of the maximum score of the associated region.

Preferably, the program code of the computer program is adapted to determine said regions by an exhaustive search of the average score map $M_{n,avg}$ for local maxima.

Further, preferably, the program code of the computer program is adapted to transform the pixel coordinates (u,v) of the current image of said spatial area into world coordinates (x, y, z) so as to reconstruct said surface in said world coordinates.

Furthermore, the problem underlying the present invention is solved by a system having the features of claim 16.

According thereto, the system according to the invention comprises:
- a light source, particularly a laser device, being designed to illuminate a surface with spatially structured light, such that said light illuminates an area of said surface from which said light is reflected back, wherein said light comprises a temporarily varying intensity in the form of successive light modulation patterns,
- an optical sensor being configured to detect light back-reflected from said area, which may include an optical filter designed to pass light from said light source preferentially, wherein said optical sensor comprises a plurality of pixels, wherein a pixel coordinate (u,v) is associated to each pixel, and wherein each pixel is designed to generate a signal (e.g. monotonically) related to the photocurrent generated by the light impinging on the respective pixel, and wherein each of said pixels outputs an address-event Ev merely when the respective signal due to the e.g. back-reflected light impinging on the respective pixel increases by an amount being larger than a first threshold $\Phi_{ON}$ or decreases by an amount being larger than a second threshold $\Phi_{OFF}$ since the last address-event Ev from the respective pixel, and
- an analyzing means connected to said sensor means, wherein the analyzing means is designed to determine, as a current image of said area, pixel coordinates (u,v) of address-events Ev' caused by light of the last light modulation pattern back-reflected from said area onto the optical sensor.

Preferably, said optical filter filters out light wavelengths outside of a light wavelength or a range of light wavelengths that are emitted by the light source.

Preferably, the analyzing means may comprise a computer configured to execute the computer program according to the invention.

Preferably, the analyzing means is designed to conduct any of the steps stated in claims 2 to 14 or any of the steps described below.

Further, preferably, the light source is designed to generate a light (intensity) modulation pattern in the form of a light pulse, particularly a rectangular light pulse.

Further, preferably, the system (e.g. optical sensor) is designed to generate each address-event Ev(u,v,t) so that it carries the coordinates (u,v) of its associated pixel, a time t at which the respective address-event Ev occurred, as well as an information whether the respective address-event Ev is an ON event at which said signal increased by an amount larger than said first threshold $\Phi_{ON}$, or an OFF event at which said signal decreased by an amount larger than said second threshold $\Phi_{OFF}$, and wherein particularly the optical sensor is designed to output an output stream comprising said address-events Ev.

Further, preferably, the system is designed to put time-events Et into the output stream in between address-events Ev of the output stream, particularly by means of the optical sensor, wherein each time-event Et is uniquely associated to one of said light modulation patterns, wherein each time-event $Et_n$ carries an ascending number n labeling the respective light pulse as well as its time t.

Further, preferably, the system (e.g. the analyzing means) is designed to assign a score s to each ON event by means of a first scoring function $P_n^{ON}(Ev)$ and to each OFF event by means of a second scoring function $P_n^{OFF}(Ev)$, wherein particularly the respective score s is a measure for the probability that the respective address-event Ev was caused by the modulation pattern associated to the last time-event $Et_n$.

Further, preferably, for determining the first scoring function ($P_n^{ON}(Ev)$), the system (e.g. the analyzing means) is designed to collect at least ON events Ev in the time-event interval $Et_{n-1}$ to $Et_n$ in bins $B_n$ of a first histogram $H_n^{ON}$ depending on the time relative to the time-event $Et_{n-1}$, wherein particularly the analyzing means is designed to determine a first average histogram $H_{n,avg}^{ON}$ as an average over m first histograms associated to m successive time-event intervals $Et_{n-m}$ to $Et_{n+m}, \ldots, Et_{n-1}$ to $Et_n$, m being a natural number (see e.g. above), and wherein for determining the second scoring function $P_n^{OFF}$ the analyzing means is designed to collect at least OFF events Ev in the time-event interval $Et_{n-1}$ to $Et_n$ in bins $B_n$ of a second histogram $H_n^{OFF}$ depending on the time relative to the time-event $Et_{n-1}$, wherein particularly the analyzing means is designed to determine a second average histogram $H_{n,avg}^{OFF}$ as an average over m second histograms associated to the preceding m successive time-event intervals $Et_{n-m}$ to $Et_{n+1-m}, \ldots, Et_{n-1}$ to $Et_n$.

Further, preferably, the system (e.g. the analyzing means) is designed to determine the first scoring function $P_n^{ON}(Ev)$ from the first average histogram $H_{n,avg}^{ON}$ by subtracting from the first average histogram $H_{n,avg}^{ON}$ the average bin count $T_n^{ON}/k$ of the first average histogram $H_{n,avg}^{ON}$, and particularly by also normalizing the first average histogram $H_{n,avg}^{ON}$ by the total number of ON events in it $T_n^{ON}$, and wherein the analyzing means is designed to determine the second scoring function $P_n^{OFF}(Ev)$ from the second average histogram $H_{n,avg}^{OFF}$ by subtracting from the second average histogram $H_{n,avg}^{OFF}$ the average bin count $T_n^{OFF}/k$ of the second average histogram $H_{n,avg}^{OFF}$, and particularly by also normalizing the second average histogram $H_{n,avg}^{OFF}$ by the total number of OFF events $T_n^{OFF}$ in it.

Further, preferably, the system (e.g. the analyzing means) is designed to generate a score map $M_n$ assigning to each pixel coordinate (u,v) the sum of the scores s of all ON and OFF events Ev with the respective address (u,v) since the last time-event $Et_n$ and before the next time-event $Et_{n+1}$, wherein particularly the system is designed to determine an average score map $M_{n,avg}$ as an average over the last o score maps, o being a natural number (see e.g. above).

Further, preferably, the system (e.g. the light source) is designed to generate spatially structured light in the form of a plane of light (or comprising such a plane of light), such that said area or said image of said area is a line pattern (or comprises such a pattern).

Further, preferably, the system (e.g. the analyzing means) is designed to determine the maximum score in the average score map $M_n$ for each column (e.g. u) of the average score map $M_{n,avg}$, wherein in case the maximum score is above a pre-defined threshold value the analyzing means is designed to determine the corresponding pixel coordinate (u,v) to be a pixel coordinate of said current image, and wherein particularly in case the average score map $M_{n,avg}$ comprises in a column scores s of neighboring pixel coordinates that are also above said threshold value, the analyzing means is designed to conduct a weighted average among the scores above said threshold value to determine the center of said current image of said area in the respective column, wherein particularly the weighting consists of multiplying each said pixel coordinate by the normalized score at this coordinate, wherein the normalized score is determined by dividing each score by the sum of the scores in the column.

Further, preferably, the system (e.g. the analyzing means) is designed to alternatively generate spatially structured light consisting of or comprising a set of light rays by means of which an area of said surface is illuminated, such that said area consists of (or comprises) a corresponding number of disconnected zones.

Preferably, in this case, the system (e.g. the analyzing means) is designed to determine the maximum scores in the average score map $M_{n,avg}$ by maintaining for each region associated to one of the zones only the maximum score, wherein the analyzing means is designed to determine the pixel coordinate (u,v) of the current image of each zone as the pixel coordinate of the maximum score of the associated region.

Preferably, the system (e.g. the analyzing means) is designed to determine said regions by an exhaustive search of the average score map $M_{n,avg}$ for local maxima.

Further, preferably, the light source providing said spatially structured light and the image sensor are arranged in a fixed spatial position with respect to each other. Further, the system is preferably configured to move relative to said surface.

Further, preferably, the system (e.g. the analyzing means) is designed to transform the pixel coordinates (u,v) of the current image of said spatial area into world coordinates (x, y, z), so as to reconstruct said surface in said world coordinates.

Furthermore, the system (e.g. a robot) may be designed to move relative (e.g. with respect) to said surface particularly on or along said surface, particularly while illuminating said surface with said spatially structured light.

Furthermore, the system is designed to reconstruct said surface in real-time while moving relative to said surface, particularly on or along said surface.

Furthermore, the system may be designed to vary said spatially structured light spatially over said successive light modulation patterns (see also above).

In the following, further advantages and features of the present invention as well as embodiments of the present invention are described with reference to the Figures, wherein.

Figure 1:
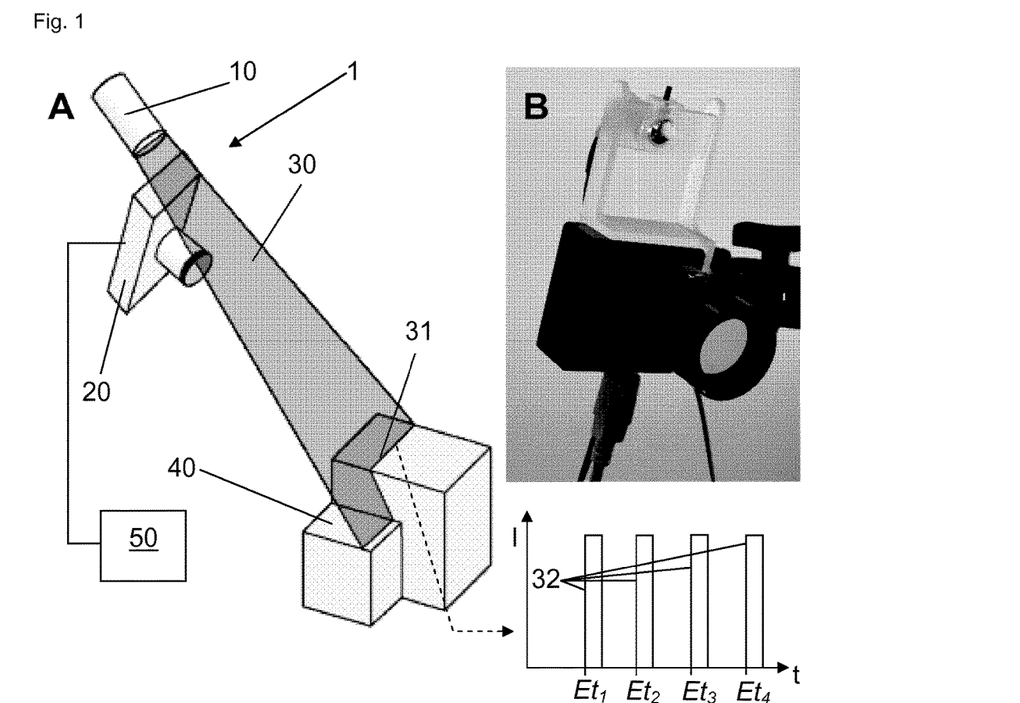
FIG. 1 shows a setup of the optical sensor (e.g. DVS) together with a light source (e.g. line laser). (A) Schematic view of the setup. (B) photo of the DVS128 camera (i.e. optical DVS sensor having 128×128 pixel with line laser): the rigid laser mount allows a constant distance and inclination angle of the laser with respect to the camera. An optical filter is mounted on the lens.

The optical sensor 20 in the form of a dynamic vision sensor used in the present invention as shown in FIG. 1 is inspired by the functionality of the retina and senses only changes in brightness (Lichtsteiner et al., 2008). Each pixel reports a change in e.g. log-illuminance larger than a given threshold by sending out an asynchronous address-event: if it becomes brighter it generates a so called "ON event", and if darker, it generates an "OFF event". The asynchronously generated address-events are communicated to a synchronous processing device by a complex programmable logic device (CPLD) which also transmits the time in microseconds at which the event occurred. Each event contains the pixel horizontal and vertical address (u,v), its polarity (ON/OFF) and the timestamp. After the event is registered, it is written into a FIFO buffer which is transferred through a high-speed USB 2.0 interface to a processing platform also denoted as analyzing means 50. The CLPD and the buffer may be arranged at the optical sensor 20 but may also be integrated into the analyzing means 50 (i.e. may form parts of the analyzing means 50). Real-time computations on the processing platform operate on the basis of so called event packets which can contain a variable number of events but are preferably delivered at a minimum frequency of 1 kHz. This approach of sensing a visual scene has the following advantages:

The absence of a global exposure time lets each pixel settle to its own operating point which leads to a dynamic range of more than 120 dB.

Because the pixels only respond to brightness changes, the output of the sensor 20 is non-redundant. This leads to a decrease in processor load and therefore to a reduction in power consumption of the system.

The asynchronous readout allows a low latency of as little as 15 µs. This latency allows fast control loops. The speed of the optical sensor is capable of resolving fast movements such as a wheel spinning at e.g. 3000 rpm.

Since the events are timestamped as they occur (with a temporal resolution of 1 µs), the output allows a detailed analysis of the dynamics in a scene or to process its output using temporal filters.

In the following, the output of the optical sensor 20 according to the invention is described as a set of events and each event Ev carries its u- and v-address, a timestamp and its polarity as a value of +1 if it is an ON event and a −1 for OFF events $$Ev(u, v, t) = \begin{cases} +1, & \text{if } \Delta\ln(I_{u,v}) > \Theta_{ON} \\ -1, & \text{if } \Delta\ln(I_{u,v}) < \Theta_{OFF} \end{cases} \quad (1)$$

where $\Delta\ln(I_{u,v})$ denotes the change in illumination at the pixel with coordinates u, v since the last event. $\Phi_{ON}$ and $\Phi_{OFF}$ denote the event thresholds that must be crossed to trigger an event. These thresholds can be set independently which allows balancing the number of ON and OFF events.

In addition to these visually triggered events, the optical sensor 20 of the system 1 according to the invention allows the injection of special, timestamped trigger events to the output stream by applying a pulse to a pin on the sensor 20. These Et events are numbered in the method/computer program according to the invention so that they carry a pulse number n and a timestamp or time t:

$$Et_n = t \quad (2)$$

There are several variations of combining a line laser 10 and a camera (e.g. optical sensor 20) to build a 3D scanner 1. Since in an embodiment of the present invention this scanner setup 1 is used on a mobile robot that particularly already has a motion model for the purpose of navigation, a mirror free, fixed geometry setup can be used. As shown in FIG. 1, a light source 10 comprising a red line laser (Laser Components GmbH LC-LML-635) with a wavelength of 635 nm and an optical power of about 3 mW is mounted at a fixed distance above the optical sensor (DVS) 20. The laser power consumption is about 135 mW. The relative angle of the laser plane or spatially structured light 30 and the optical sensor 20 is fixed. To run the surface (40) reconstruction, the system 1 is moved over the terrain's surface 40 while the laser of the light source 10 is pulsed at a frequency $f_p$. Each pulse of the laser 10 initiated the acquisition of a set of events Ev for further analysis and laser stripe or area 31 extraction. As a background illumination level a brightly-lit laboratory at approximately 500 lx was used.

For the exemplary measurements described below, the system 1 was fixed and the terrain's surface 40 to scan was moved on an actuated sled on rails underneath it. This led to a simple linear camera motion model determined by the speed of the DC motor that pulled the sled towards the sensor system. The sled was fixed to rails which locked the system 1 in one dimension and led to highly repeatable measurements. The optical sensor 20 was equipped with a lens having a focal length of 10 mm and it was aimed at the terrain's surface 40 from a distance of 0.45 m. The laser module 10 was placed at a distance of 55 mm from the optical sensor 20 at an inclination angle $\alpha_L$ of 8° with respect to the principal axis of the optical sensor. The system 1 observed the scene at an inclination angle $\alpha_C$ of 39°.

To enhance the signal to noise ratio, i.e. the percentage of events originating from the pulsed laser line 31, the optical sensor 20 was equipped with an optical band pass filter (Edmund Optics NT65-167) centered at 636 nm in an embodiment. The filter has full width at half maximum (FWHM) of 10 nm and a transmittance of 85% in the pass band and less than 0.01% in the stop band (optical density 4.0).

To mark the laser pulses 32 within the event output stream from the optical sensor 20, the event trigger pin of the optical sensor 20 was connected to a function generator triggering the laser of the light source 10.

To extract the laser stripe 31, i.e. the pixels whose events originate from the laser line 30, the optical sensor 20 is calibrated based on the approach described in (Siegwart, 2011). The model was simplified by the following assumptions:

For the intrinsic camera model, rectangular pixels with orthogonal coordinates u,v are assumed. This leads to the following transformation from pixel coordinates to camera coordinates $x_C$, $y_C$, $z_C$:

$$u = \frac{kf_l}{z_C}x_C + u_0 \quad (3)$$

$$v = \frac{kf_l}{z_C}y_C + v_0 \quad (4)$$

where k denotes the inverse of the pixel size, $f_l$ the focal length in pixels, and $u_0, v_0$ the center pixel coordinates.

Figure 2:
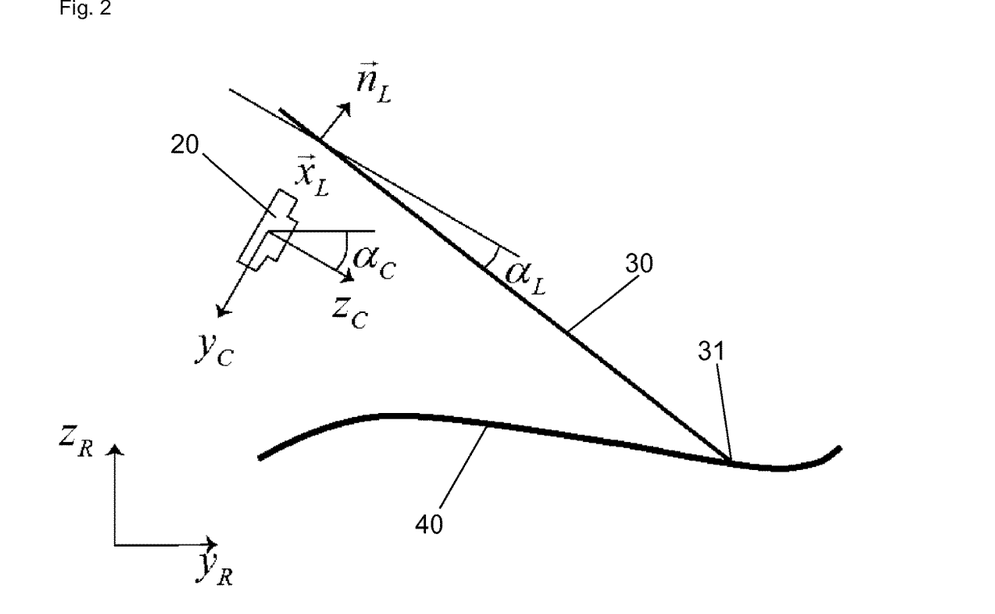
FIG. 2 shows the coordinate systems used along the scanning direction. $y_R$, $z_R$ are the real world coordinates, $y_C$, $z_C$ the ones of the camera. $x_L$ is the distance of the laser line plane perpendicular to $n_L$ from the camera origin. $\alpha_C$ is the inclination angle of the sensor with respect to the horizontal plane and $\alpha_L$ the laser inclination angle with respect to the camera.

For the extrinsic camera model it was assumed that the rail restricts the origin of the camera $x_{C0}$, $y_{C0}$, $z_{C0}$ to a planar translation (by $t_y$ and $t_z$) within a plane spanned by the y- and z-axis of the world reference frame $x_R$, $y_R$ and $z_R$ as depicted in FIG. 2. In the setup used for the measurement, the rotational degrees of freedom of the system were constrained so that the camera could only rotate (by $\alpha_C$) around its x-axis which leads to following transformation from camera to world coordinates:

$$\begin{pmatrix} x_R \\ y_R \\ z_R \end{pmatrix} = \begin{pmatrix} 1 & 0 & 0 \\ 0 & \cos(\alpha_C + \frac{\pi}{2}) & \sin(\alpha_C + \frac{\pi}{2}) \\ 0 & -\sin(\alpha_C + \frac{\pi}{2}) & \cos(\alpha_C + \frac{\pi}{2}) \end{pmatrix} \begin{pmatrix} x_C \\ y_C \\ z_C \end{pmatrix} + \begin{pmatrix} 0 \\ t_y \\ t_z \end{pmatrix} \quad (5)$$

Figure 3:
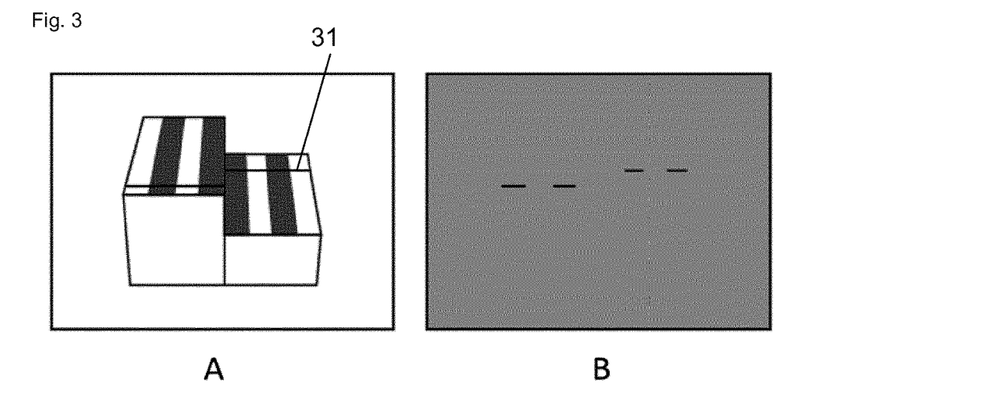
FIG. 3 shows a calibration setup. The light source (e.g. pulsed laser) shines onto two striped blocks of different height. (A) Schematic view. (B) Schematic of the optical sensor's (DVS) output: The laser is absorbed by the black stripes and only the white stripes generate events.

The fact that the optical sensor (DVS) 20 does not produce any output for static scenes makes it difficult to find and align correspondences and therefore the typical checkerboard pattern could not be used for calibration. As an alternative, the laser was pulsed (31) onto two striped blocks of different heights as depicted in FIG. 3. The black stripes on the blocks absorb sufficient laser light to not excite any events in the DVS 20. This setup allows finding sufficient correspondence points between the real world coordinates and the pixel coordinates to solve the set of calibration equations (Eqs. 3-5). This procedure needs only to be done once for a particular geometry of optical sensor 20 and light source 10.

Figure 4:
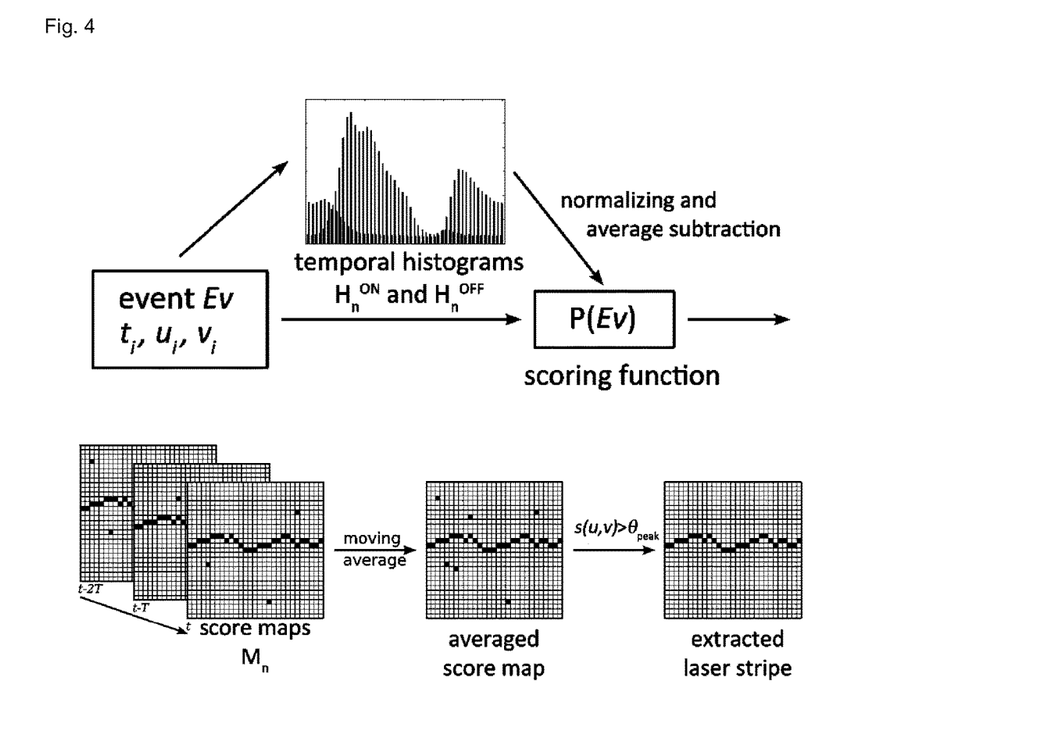
FIG. 4 shows a schematic overview of the laser stripe extraction filter. At the arrival of each light modulation pattern (here a laser pulse) the temporal histograms are used to adapt the scoring functions P, and each event's score is calculated and mapped on the score maps M. The maps are averaged and the laser stripe is extracted by selecting the maximum scoring pixel for each column, if it is above the threshold $\theta_{peak}$.

The stripe extraction method is summarized in FIG. 4. Most laser stripe extraction algorithms perform a simple column-wise maximum computation to find the peak in light intensity e.g. (Robinson et al., 2003).

Accordingly, for the optical sensor (DVS) 20 the simplest approach to extract the laser stripe 31 would be to accumulate all events after a laser pulse 32 and find the column-wise maximum in activity. This approach performs poorly due to background activity: Even with the optical filter in place, contrast edges that move relative to the sensor 20 also induce events which corrupt the signal to noise ratio. For a more robust laser stripe 31 extraction, spatial constraints could be introduced but this would restrict the generality of the approach. Instead the proposed approach exploits the highly resolved temporal information of the output of the optical sensor (DVS) 20.

With the help of the laser trigger events $Et_n$, the event stream can be sliced into a set of time windows $W_n$ each containing a set of events $S_n$ where n denotes the n'th trigger event. ON and OFF events are placed into separate sets (for simplicity only the formulas for the ON events are shown, the formulas for the OFF events are formulated analogously):

$$W_n = \{t: t > Et_n \wedge t < Et_{n+1}\} \quad (6)$$

$$S_n^{ON} = \{Ev(u,v,t): t \in W_n \wedge Ev > 0\} \quad (7)$$

Figure 5:
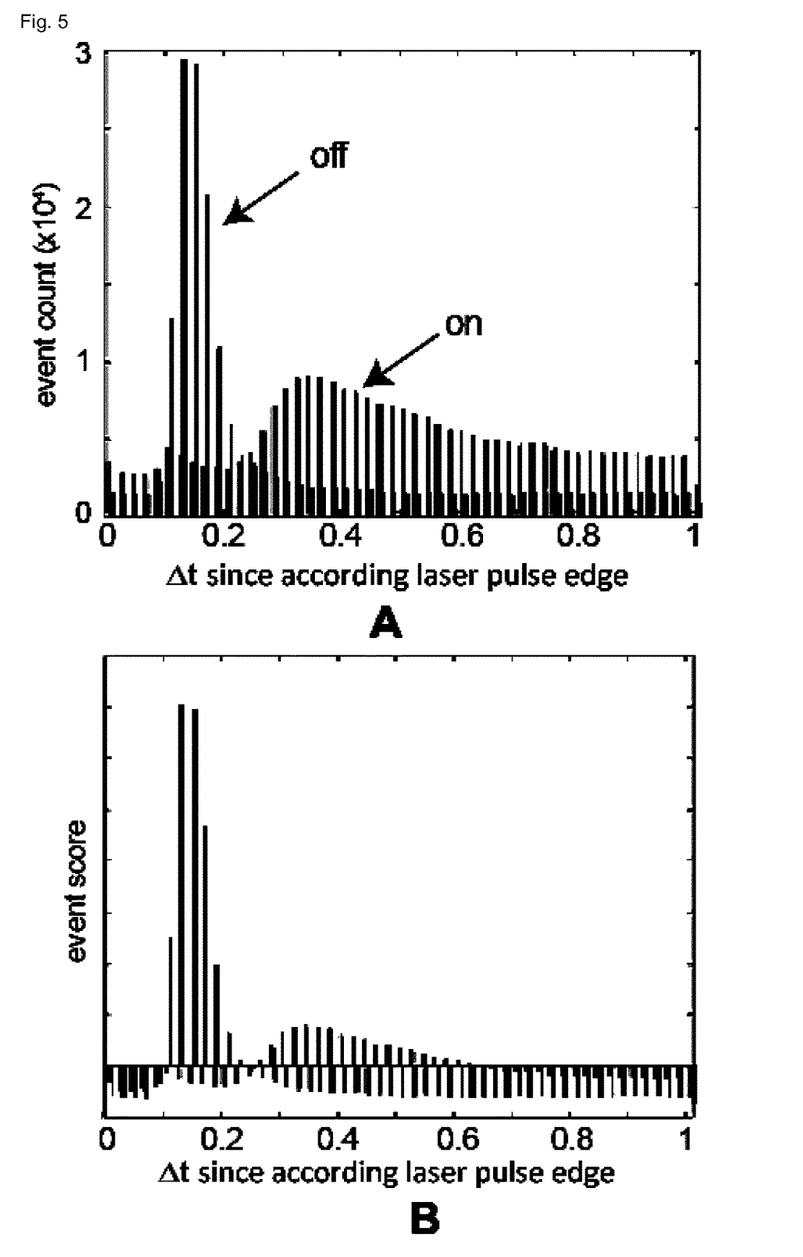
FIG. 5 shows examples of event histograms of the laser (light source) pulsed at 1 kHz at the relief used for the reconstruction. (A) Measured histograms of ON and OFF events following laser pulse ON and OFF edges. (B) Resulting OFF and ON scoring functions after normalization and mean subtraction.

The timing of the events is jittered by the asynchronous communication and is also dependent on the optical sensor's 20 bias settings and light conditions. Preliminary experiments showed that it is not sufficient to only accumulate the events in a fixed time window after the pulse 32. Instead a stable laser stripe 31 extraction algorithm must adaptively collect relevant events. This adaptation is achieved by using of a temporal scoring function P which is continually updated as illustrated in FIG. 5.

The scoring function is used as follows: Each event obtains a score s=P(Ev) depending only on its time relative to the last trigger. From these s a score map $M_n$ (FIG. 4) is established where each pixel (u, v) of Mn contains the sum of the scores of all the events with address (u, v) within the set $S_n$ (these subsets of $S_n$ are denoted as $C_n(u,v)$). In other words, $M_n$ is a 2D histogram of event scores. This score map tells us for each pixel how well-timed the events were with respect to the n'th trigger event, and it is computed by Eqs. 9-10:

$$C_n^{ON}(u, v) = \{Ev(u', v', t): Ev \in S_n^{ON} \wedge u' = u \wedge v' = v\} \quad (9)$$

$$M_n(u, v) = \sum_{C^{ON}(u,v)} P_n^{ON}(Ev) + \sum_{C^{OFF}(u,v)} P_n^{OFF}(Ev) \quad (10)$$

The scoring function P that assigns each event a score indicating how probable it is that it was caused by the laser pulse $Et_n$ is obtained by using another histogram-based approach. The rationale behind this approach is the following: All events that are caused by the laser pulse are temporally correlated with it while noise events generate a uniform temporal distribution. In a histogram with binned relative times, the events triggered by the laser pulse form peaks. In the proposed algorithm, the histogram $H_n$ consists of k bins $B_n$ of width $f_k$. For stability, $H_n$ is an average over m laser pulses or light modulation patterns (also denoted as $H_{n,avg}$ herein). $H_n$ is constructed by Eqs. 11-13:

$$D_n^{ON}(l) = \left\{ Ev(u, v, t): Ev \in S_n^{ON} \bigwedge t - Et_n \geq \frac{l}{fk} \bigwedge t - Et_n < \frac{l+1}{fk} \right\} \quad (11)$$

$$B_n^{ON}(l) = \sum_{i=n-m}^{n-1} \sum_{D_i^{ON}(l)} \|Ev\| \quad (12)$$

$$H_n^{ON} = \{B_n^{ON}(l): l \in [0, k-1]\} \quad (13)$$

where f is the laser frequency, I is the bin index, k is the number of bins, $D_n(I)$ is a temporal bin of the set $S_n$, $B_n(I)$ is a bin of the averaged histogram over the m pulses and the histogram $H_n$ is the set of all bins $B_n$. It is illustrated in FIG. 5A.

To obtain the scoring function P, the $H_n^{ON}$ and $H_n^{OFF}$ histograms are normalized by the total number T of events in them. To penalize bins that have a count below the average i.e. bins that are dominated by the uniformly distributed noise, the average bin count T/k is subtracted from each bin. An event can have a negative score. This is the case if it is more probable that it is noise than signal. $T_n$ is computed from Eq. 14:

$$T_n^{ON} = \Sigma\{B_n^{ON}: B_n^{ON} \in H_n^{ON}\} \quad (14)$$

The n'th scoring function $P_n$ (illustrated in FIG. 5B) is computed from Eq. 15:

$$P_n^{ON}(Ev) = \frac{\sum\{B_n^{ON}: Ev \in B_n^{ON}\} - \left(\frac{T_n^{ON}}{k}\right)}{T_n^{ON}} \quad (15)$$

To extract the laser stripe (area) 31, the last o score maps are averaged ($M_{n,avg}$) and the maximum score s(u,v) and its v value are determined for each column (preferably, the columns extends across/perpendicular to the laser stripe/area 31 image). If the maximum value is above a threshold $\Phi_{peak}$ it is considered to be a laser stripe pixel. If the neighboring pixels are also above the threshold, a weighted average is applied among them to determine the center of the laser stripe. The positions of the laser stripe 31 are then transformed into real world coordinates using Eqs. 3-5 and thus mapped as surface points.

The following pseudo-code

```
//iterate over all events in a packet
for event:packet
    //the laser stripe extraction is only done at
    //the arrival of a new pulse
    if(event.isTrigger)
        lastTrigger = event.timestamphistogramAverage.add(histogram)
        histogram.clear( )
        //update done according to eq.(15)
        scoreFunction.update(histogramAverage)averageMap.add(scoreMap)
        laserLine = averageMap.findColumPeaks( )
    else
        //update of histogram
        deltaT = lastTrigger-event.timestamp
        bin Index = deltaT*k/period
        histogram.bin[binIndex]++
        //update of score map
        score = scoreFunction.get(binIndex)
        scoreMap[event.u][event.v]+=score
    end if
``` illustrates how the algorithm is preferably executed in the computer program according to the invention: Only on the arrival of a new laser trigger event, the histograms are averaged, the score maps are averaged to an average score map and the laser stripe is extracted. Otherwise, for each event Ev of the optical sensor (DVS) 20 only its contribution to the current score map is computed, using the current scoring function. The laser stripe 31 extraction and computation of the scoring function operate on different time scales. While the length o of the moving average for the scoring function is chosen as small as possible to ensure a low latency, the number of histograms m to be averaged is preferably chosen as large as possible to obtain higher stability and dampen the effect of variable background activity.

Algorithm Optimization: To reduce the memory consumption and the computational cost of this "frame-based" algorithm, the computations of the scoring function, the accumulation of evidence into a score map, and the search for the laser line columns were optimized to be event-based.

The average histogram changes only on a long time scale (depending on lighting conditions and sensor biasing) and this fact is exploited by only updating the averaged histogram every m'th pulse. The m histograms do not need to be memorized and each event only increases the bin count. The new scoring function is computed from the accumulated histogram by normalizing it only after the m'th pulse.

The score map computation is optimized by accumulating event scores for o laser pulses. Each event requires only a lookup of its score and a sum into the score map.

After each sum, if the new score value is higher than the previous maximum score for that column, then the new maximum score value and its location are stored for that column. This accumulation increases the latency by a factor of o, but is necessary in any case when the optical sensor's (DVS) events are not reliably generated by each pulse edge.

After the o laser pulses 32 are accumulated, the search of the column wise maxima laser line pixels is based on the maximum values and their locations stored during accumulation. For each column, the weighted mean location of the peak is computed starting at the stored peak value and iterating over pixels up and down from the peak location until the score drops below the threshold value. This way, only a few pixels of the score map are inspected for each column.

The final step is to reset the accumulated score map and peak values to zero. This low-level memory reset is done by microprocessor logic hardware and is very fast.

Because the DVS 20 does analog computation at the pixel level, the behavior of the sensor 20 depends on the sensor bias settings. These settings can be used to control parameters such as the temporal contrast cutoff frequency and the threshold levels. For the experiments described in the following, the bias settings were optimized to report small as well as fast changes. These settings lead to an increase in noise events which does not affect the performance because they are filtered out successfully with the algorithm described previously. Furthermore, the biases are set to produce a clear peak in the temporal histogram of the OFF events (FIG. 5). The variation in the peak form for ON and OFF events is caused by the different detection circuits for the two polarities in the pixel (Lichtsteiner et al., 2008) and different starting illumination conditions before the pulse edges.

The parameters for the algorithm are chosen heuristically: The bin size is fixed to 50 µs, the scoring function average is taken over a sliding window size m=1000 histograms, the stripe detection is set to average o=3 probability maps, and the peak threshold for the line detection is chosen to be $\Phi_{peak}$=1.5.

Firstly, the performance of the stripe extraction algorithm was measured. Finally, a complex 3D terrain was used to assess the performance under more realistic conditions.

Comparing the computational cost to process an event (measured in CPU time) between the frame-based and the event-based algorithm with o=10 pulses showed an 1800% improvement from 900 ns to 50 ns per event. This improvement is a direct result of the sparse sensor output: For each laser line point update, only a few active pixels around the peak value in the score map column are considered, rather than the entire column. At the typical event rate of 500 keps observed in the terrain reconstruction example, using a laser pulse frequency of 500 Hz, a single core of a Core i7 850 personal computer is occupied 2.5% of its available processor time using the event-based algorithm, measured by using the Windows 7 resource monitoring utility. Turning off the scoring function histogram update further decreases compute time to an average of 30 ns/event, only 25 ns more than processing event packets with a "no operation" filter that iterates over packets of DVS 20 events without doing anything else.

To assess the line-detection performance of the stripe extraction algorithm, a ground truth was manually established for a scenario in which a plain block of uniform height was passed under the setup. The block was moved at about 2 cm/s to investigate the performance of the laser stripe 31 extraction algorithm at different frequencies. In Table 1, the results of these measurements are displayed: "False positives" designates the ratio of events wrongly associated to the line over the total number of events. The performance of the algorithm drops at a frequency of 500 Hz and because the DVS should be capable of detecting temporal contrasts in the kHz regime, this was further investigated. For optimal algorithm performance, each pulse should at least excite one event per column. This is not the case for the line laser pulsed at 500 Hz because the pixel bandwidth at the laser intensity used is limited to about this frequency. Therefore not every pulse results in a DVS event, and so the laser stripe can only be found in a few columns which leads to a degradation of the reconstruction quality from single laser pulses.

TABLE 1

Performance of the line extraction algorithm. The line laser is not strong enough to perform well at frequencies above 200 Hz.

| Frequency | False positives |
|---|---|
| 50 Hz | 0.14% |
| 100 Hz | <0.01% |
| 200 Hz | 0.03% |
| 500 Hz | 5.75% |

Figure 6:
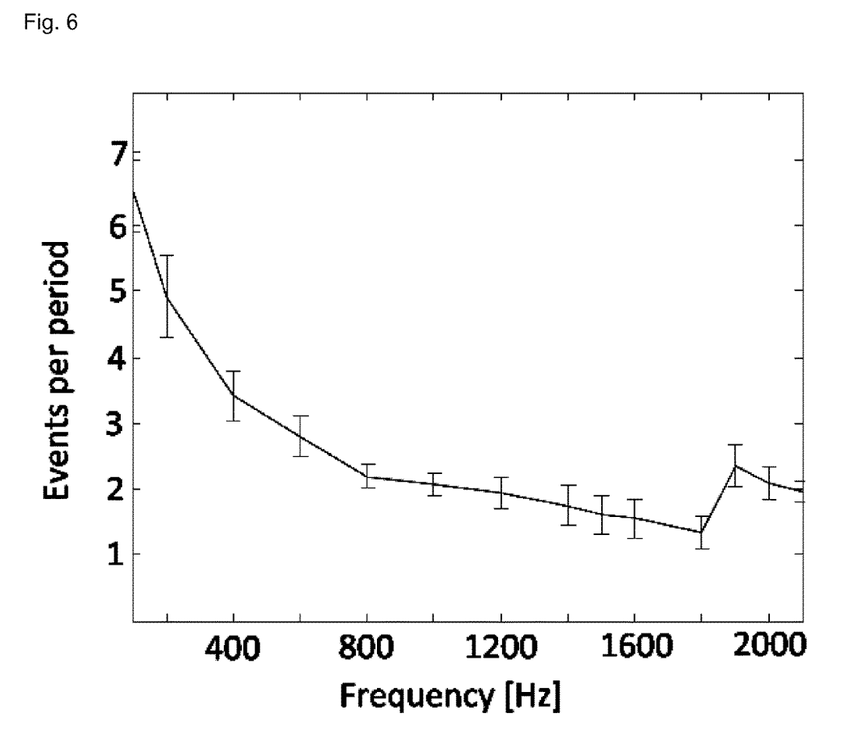
FIG. 6 shows the number of events at a pixel per laser pulse of a 4.75 mW point laser. Although the event count drop with higher frequencies, the average does not drop below 1 event per cycle even at 2 kHz.

To explore how fast the system could go, another laser setup was used: A stronger point laser (4.75 mW, Class C) was pulsed using a mechanical shutter to avoid artifacts from the rise and fall time of the electronic driver. This point was recorded with the optical sensor (DVS) 20 to investigate whether it can elicit more at least one event per polarity and pulse at high frequencies. The measurements in FIG. 6 show that even at frequencies exceeding 2 kHz sufficient events are triggered by the pulse. The mechanical shutter did not allow pulsing the laser faster than 2.1 kHz so the DVS might even go faster. The increase of events per pulse above 1.8 kHz is probably caused by resonances in the optical sensor (DVS) photoreceptor circuits which facilitate the event generation. These findings indicate that using the current optical sensor (DVS) a system using a sufficiently strong line laser should be capable of running at up to 2 kHz. or even higher frequency depending on the surface reflectivity, the DVS pixel design, the pixel biasing currents, and the requirements for pulse reliability. It could be, for example, that it is not necessary for a particular application that every cycle of the laser pulsing elicits a DVS event. Even in the condition that not every cycle elicits a pulse, the events that are emitted will still be related to the pulse phase so that they can be filtered by the methods described previously.

Figure 7:
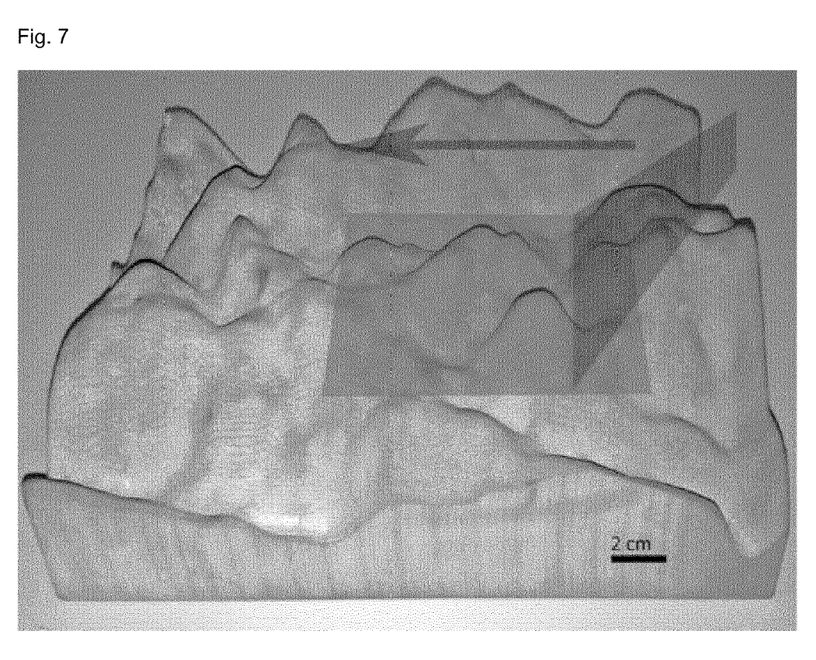
FIG. 7 shows an artificial 3D rapid prototype terrain used for an exemplary reconstruction. Shown is the area depicted in FIG. 8, the laser line, and the scan direction.
Figure 8:
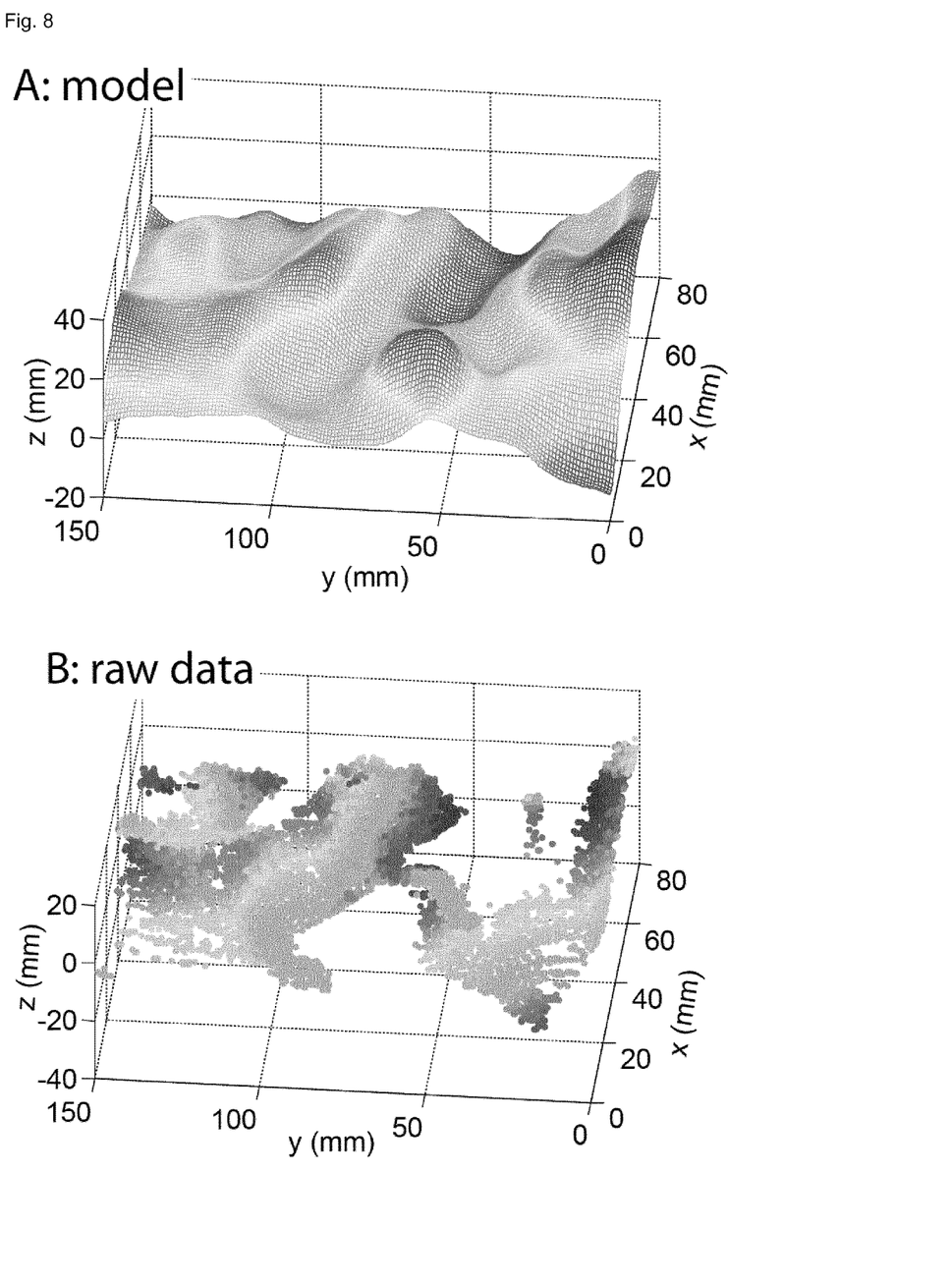
FIG. 8 shows a reconstructed surface. (A) CAD model of the surface. (B) measured data points. (C) interpolated reconstruction of the surface using Mathworks Corporation Matlab's TriScatteredInterp function. (D) distance between closest reconstruction point and model aligned using the ICP algorithm of Besl and McKay (1992). This section of the reconstruction was chosen for display because in the surrounding area border effects were observed caused by the Gaussian profile of the laser line that reduced the DVS event rate to be too low to result in acceptable reconstruction.

In an example, an artificial terrain was designed with a CAD program and it was fabricated on a 3D printer (FIG. 7). The sensor setup of FIG. 1 was used together with the sled to capture data at a speed of 1.94 cm/s over this terrain using a laser pulse frequency of 200 Hz, translating in the $t_y$ direction (Eq. 5). (This slow speed was a limitation of the DC motor driving the sled.) FIG. 8 shows results of these measurements: FIG. 8A shows the CAD model and FIG. 8B shows the raw extracted line data after transformation through Eq. 5 using the calibration parameters and the measured sled speed. The blind spots where the laser 10 did not reach the surface and the higher sampling density on front surfaces are evident. These blind spots were filled by applying the MATLAB© function TriScatteredInterp on the sample points as shown in FIG. 8C. Finally, FIG. 8D shows the error between the reconstruction and model as explained in the next paragraph.

To quantify the error, the data was compared to the ground truth of the CAD model. However, the model and data lack alignment marks and therefore they were first aligned by hand using a global translation. Next, the alignment was refined using the iterative closest point algorithm (ICP of Besl and McKay (1992)), which slightly adjusted the global translation and rotation to minimize the summed absolute distance errors. Thirdly the closest 3D point of the model was determined for each point of the non-interpolated FIG. 8B raw data and fourthly the distance to this model point was measured. The resulting accuracy i.e. the mean 3D distance between these two points in the 3D data is 1.7±1.1 mm, i.e. the mean absolute distance between the sample and data points is 1.7 mm but the errors vary with a standard deviation of 1.1 mm. This accuracy represents ±0.25 pixel precision of measurement of the laser line given the geometry of the measurement setup. In the resampled, linearly interpolated data shown in FIG. 8D, most of the error originates from the parts of the surface where the line laser is occluded by the surface, which are interpolated as flat surfaces, and in particular the bottoms of the valleys show the worst error, as could be expected.

In the present application the first application of a dynamic vision sensor 20 as a sensing device for surface (40) reconstruction, particularly in an active sensor setup, was demonstrated. An adaptive event-based filtering algorithm for efficiently extracting the laser line 31 position is proposed. The proposed application of dynamic vision sensors in e.g. active sensor setups such as 3D scanners 1 allows surface reconstruction with high temporal resolution without the necessity of using a power-consuming high-speed camera and subsequent high frame rate processing or any moving parts. The event-based output of DVSs 20 reduces the computational load and thereby decreases the latency and power consumption of such systems. The system 1 benefits from the high dynamic range and the sparse output of the sensor 20 as well as the highly resolved time information on the dynamics in a scene. With the proposed algorithm, temporal correlations between the pulsed stimulus and the recorded signal can be extracted as well as used as filtering criterion for the stripe 31 extraction.

REFERENCES

Besl, P. J., and McKay, N. D. (1992). A Method for Registration of 3-D shapes. IEEE Trans. Pattern Anal. Mach. Intell 239-256. doi: 10.1109/34.121791.

Lichtsteiner, P., Posch, C., and Delbruck, T. (2008). A 128×128 120 dB 15 µs Latency Asynchronous Temporal Contrast Vision Sensor. IEEE J. Solid-State Circuits 43, 566-576. doi: 10.1109/JSSC.2007.914337.

Robinson, A., Alboul, L., and Rodrigues, M. (2003). Methods for Indexing Stripes in Uncoded Structured Light Scanning Systems. in International Conference in Central Europe on Computer Graphics, Visualization and Computer Vision (Plzen-Bory, Czech Republic). Available at: http://wscg.zcu.cz/WSCG2004/Papers_2004_Full/111.pdf.

Siegwart, R. (2011). Introduction to Autonomous Mobile Robots. 2nd ed. Cambridge, Mass.: MIT Press.

The invention claimed is:

1. Method for detecting and reconstructing a surface, said method comprising the following steps:

illuminating a surface (40) with spatially structured light (30), such that said light illuminates an area (31) of said surface (40) from which said light is reflected back, said light comprises a temporarily varying intensity (I) in the form of successive light modulation patterns (32):

detecting back-reflected light by an optical sensor (20) that comprises a plurality of pixels, a pixel coordinate (u,v) is associated to each pixel, and each pixel generates a photocurrent being proportional to the intensity of the light impinging on a respective pixel, and computes a signal related to said photocurrent, and each pixel outputs an address-event (Ev) merely when the respective signal due to the light impinging on the respective pixel increases by an amount being larger than a first threshold ($\Theta_{ON}$) or decreases by an amount being larger than a second threshold ($\Theta_{OFF}$) since a last address-event (Ev) from the respective pixel;

determining, as a current image of said area (31), pixel coordinates (u,v) of address-events (Ev') caused by light of a last light modulation pattern (32) back-reflected from said area (31) onto the optical sensor (20); and wherein each address-event (Ev(u,v,t)) carries the coordinates (u,v) of its associated pixel, a time (t) at which a respective address-event (Ev) occurred, as well as an information whether the respective address-event (Ev) is an ON event at which said signal increased by an amount larger than said first threshold ($\Theta_{ON}$), or an OFF event at which said signal decreased by an amount larger than said second threshold ($\Theta_{OFF}$), and an output stream is output by the optical sensor (20) comprising said address-events (Ev), and wherein a score (s) is assigned to each ON event by a first scoring function ($P_n^{ON}(Ev)$) and to each OFF event by a second scoring function ($P_n^{OFF}(Ev)$), the respective score (s) is a measure for a probability that the respective address-event (Ev) was caused by the light modulation pattern (32) associated to the last time-event $Et_n$.

2. Method according to claim 1, wherein said light modulation pattern (32) is a rectangular light pulse.

3. Method according to claim 1, wherein time-events $Et_n$ are injected into the output stream in between address-events (Ev) of the output stream the optical sensor (20), each time-event $Et_n$ is uniquely associated to one of said light modulation patterns (32), and each time-event $Et_n$ carries an ascending number n labeling the respective light modulation pattern (32), as well as its time (t).

4. Method according to claim 1, wherein for determining the first scoring function ($P_n^{ON}$(Ev)) at least ON events (Ev) in the time-event interval $Et_{n-1}$ to $Et_n$ are collected in bins ($B_n$) of a first histogram ($H_n^{ON}$) depending on a time relative to the time-event $Et_{n-1}$, a first average histogram ($H_{n,avg}^{ON}$) is determined as an average over m first histograms associated to m successive time-event intervals $Et_{n-m}$ to $Et_{n+1-m}, \ldots, Et_{n-1}$ to $Et_n$, m being a natural number, and for determining the second scoring function ($P_n^{OFF}$(Ev)) at least OFF events (Ev) in the time-event interval $Et_{n-1}$ to $Et_n$ are collected in bins ($B_n$) of a second histogram ($H_n^{OFF}$) depending on the time relative to the time-event $Et_{n-1}$, a second average histogram ($H_{n,avg}^{OFF}$) is determined as an average over m second histograms associated to m successive time-event intervals $Et_{n-m}$ to $Et_{n+1-m}, \ldots, Et_{n-1}$ to $Et_n$.

5. Method according to claim 4, wherein the first scoring function ($P_n^{ON}$(Ev)) is determined from the first average histogram ($H_{n,avg}^{ON}$) by subtracting from the first average histogram ($H_{n,avg}^{ON}$) an average bin count ($T_n^{ON}$/k) of the first average histogram ($H_{n,avg}^{ON}$), and by also normalizing the first average histogram ($H_{n,avg}^{ON}$) by a total number of ON events ($T_n^{ON}$) in it, and the second scoring function ($P_n^{OFF}$(Ev)) is determined from the second average histogram ($H_{n,avg}^{OFF}$) by subtracting from the second average histogram ($H_{n,avg}^{OFF}$) an average bin count ($T_n^{OFF}$/k) of the second average histogram ($H_{n,avg}^{OFF}$), and by also normalizing the second average histogram ($H_{n,avg}^{OFF}$) by a total number of OFF events ($T_n^{OFF}$) in it.

6. Method according to claim 1, wherein a score map ($M_n$) is generated assigning to each pixel coordinate (u,v) a sum of the scores (s) of all ON and OFF events (Ev) for a respective pixel coordinate (u,v) since a last time-event $Et_n$ and before a next time-event $Et_{n+1}$, an average score map ($M_{n,avg}$) is determined as an average over a last o score maps ($M_n$), o being a natural number.

7. Method according to claim 6, wherein a maximum score in the average score map ($M_{n,avg}$) is determined for each column of the average score map ($M_{n,avg}$), in case the maximum score is above a pre-defined threshold value the corresponding pixel coordinate (u,v) is determined to be a pixel coordinate of said current image, and in case the average score map ($M_{n,avg}$) comprises in a column scores (s) of neighboring pixel coordinates that are also above said threshold value, a weighted average among the scores above said threshold value is conducted to determine a center of said current image of said area in a respective column, the weighting consists of multiplying each of said pixel coordinates by a normalized score at a respective coordinate, and the normalized score is determined by dividing each score by a sum of scores in the column.

8. Method according to claim 1, wherein the spatially structured light (30) is a plane of light (30), such that said area (31) or said image of said area is a line pattern (31).

9. Method according to claim 1, wherein the spatially structured light (30) consists of a set of light rays by means of which an area of said surface (40) is illuminated, such that said area consists of a corresponding number of disconnected zones, the maximum scores in an average score map ($M_{n,avg}$) are determined by maintaining for each region associated to one of the disconnected zones only a maximum score, the pixel coordinate (u,v) of the current image of each zone is determined as the pixel coordinate of the maximum score of an associated region, and said regions are determined by an exhaustive search of the average score map ($M_{n,avg}$) for local maxima.

10. Method according to claim 1, wherein a light source (10) providing said spatially structured light (30) and the optical sensor (20) remain in a fixed spatial position with respect to each other while moving relative to said surface (40).

11. Method according to claim 1, wherein the pixel coordinates (u,v) of the current image of said spatial area (31) are transformed into world coordinates (x,y,z) so as to reconstruct said surface (40) in said world coordinates.

12. Method according to claim 1, wherein the spatial structure (30) of the spatially structured light (30) is varied over said successive light modulation patterns (32), that a large fraction of said surface (40) is covered by said illuminated spatial area (31).

13. System for reconstructing a surface, the system including a set of computer executable instructions stored on a non-transitory computer readable medium and arranged to execute the following steps on a microprocessor:
receiving an output stream from an optical sensor (20) comprising address-events (Ev) generated by said optical sensor (20) when a surface (40) is illuminated with spatially structured light (30), such that said light illuminates an area (31) of said surface (40) from which at least a portion of said light is reflected back onto the optical sensor (20), wherein said light comprises a temporarily varying intensity (I) in the form of successive light modulation patterns (32), and wherein said optical sensor (20) comprises pixels, wherein a pixel coordinate (u,v) is associated to each pixel, and wherein each pixel generates a signal related to a photocurrent being related to the intensity of the light impinging on the respective pixel, and wherein each pixel outputs an address-event (Ev) comprised by said output stream merely when the respective signal due to back-reflected light impinging on the respective pixel increases by an amount being larger than a first threshold $\Theta_{ON}$ or decreases by an amount being larger than a second threshold $\Theta_{OFF}$ since the last address-event (Ev) from the respective pixel, and wherein
as a current image of said area (31), pixel coordinates (u,v) of address-events (Ev') caused by light of the last light modulation pattern (32) back-reflected from said area (31) onto the optical sensor (20) are determined using scored address-events (Ev) of the optical sensor (20), wherein the address events (Ev) are scored using collected statistics of the times (t) of the address-events (Ev).

14. System for reconstructing a surface, said system comprising:
a light source (10) being designed to illuminate a surface (40) with spatially structured light, such that said light illuminates an area (31) of said surface (40) from which said light is reflected back, said light comprises a temporarily varying intensity (I) in the form of successive light modulation patterns (32),
an optical sensor (20) being configured to detect light back-reflected from said area (31), said optical sensor (20) comprises an optical filter that is designed to filter out light wavelengths lying outside of a range of wavelengths of said light source (10), and said optical sensor (20) comprises a plurality of pixels, a pixel coordinate (u,v) is associated to each pixel, and each pixel is designed to generate a signal related to a photocurrent generated by the light impinging on a respective pixel, and each of said pixels outputs an address-event (Ev) merely when a respective signal due to the light impinging on the respective pixel increases by an amount being larger than a first threshold ($\Theta_{ON}$) or decreases by an amount being larger than a second threshold ($\Theta_{OFF}$) since the last address-event (Ev) from the respective pixel, and an analyzing means (50) connected to said optical sensor (20) for determining, as a current image of said area (31), pixel coordinates (u,v) of address-events (Ev') caused by light of a last light modulation pattern (32) back-reflected from said area (31) onto the optical sensor (20); and the system is designed to generate each address-event $E_v(u,v,t)$ so that it carries the coordinates (u,v) of its associated pixel, a time t at which the respective address-event Ev occurred, as well as an information whether the respective address-event Ev is an ON event at which said signal increased by an amount larger than said first threshold ($\Theta_{ON}$), or an OFF event at which said signal decreased by an amount larger than said second threshold ($\Theta_{OFF}$), and the system is designed to assign a score s to each ON event by means of a first scoring function $P_n^{ON}(Ev)$ and to each OFF event by means of a second scoring function $P_n^{OFF}(Ev)$, wherein the respective score (s) is a measure for the probability that the respective address-event (Ev) was caused by the light modulation pattern (32) associated to the last time-event $Et_n$.

\* \* \* \* \*